(12) United States Patent
Anthony Samy et al.

(10) Patent No.: US 10,839,208 B2
(45) Date of Patent: Nov. 17, 2020

(54) SYSTEM AND METHOD FOR DETECTING FRAUDULENT DOCUMENTS

(71) Applicant: Accenture Global Solutions Limited, Dublin (IE)

(72) Inventors: Julian Addison Anthony Samy, Singapore (SG); Kamal Mannar, Singapore (SG); Thanh Hai Le, Singapore (SG); Tau Herng Lim, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 98 days.

(21) Appl. No.: 16/215,159

(22) Filed: Dec. 10, 2018

(65) Prior Publication Data

US 2020/0184212 A1    Jun. 11, 2020

(51) Int. Cl.
*G06K 9/00* (2006.01)
*G06K 9/03* (2006.01)
*G06N 3/08* (2006.01)
*G06F 40/30* (2020.01)

(52) U.S. Cl.
CPC ......... *G06K 9/00483* (2013.01); *G06F 40/30* (2020.01); *G06K 9/00463* (2013.01); *G06K 9/036* (2013.01); *G06N 3/086* (2013.01); *G06K 2209/01* (2013.01)

(58) Field of Classification Search
CPC ............... G06K 9/00483; G06K 9/036; G06K 9/00463; G06K 2209/01; G06F 40/30; G06N 3/086
See application file for complete search history.

(56) References Cited

U.S. PATENT DOCUMENTS

| | | | |
|---|---|---|---|
| 10,460,235 B1 * | 10/2019 | Truong | H04L 63/1416 |
| 10,482,174 B1 * | 11/2019 | Goodsitt | G06F 40/174 |
| 2017/0277945 A1 * | 9/2017 | Budihal | G06K 9/3208 |
| 2018/0107887 A1 * | 4/2018 | Huber, Jr. | G06K 9/036 |
| 2018/0322366 A1 * | 11/2018 | Lim | G06K 9/6255 |
| 2019/0147333 A1 * | 5/2019 | Kallur Palli Kumar | G06N 3/08 706/25 |
| 2019/0236614 A1 * | 8/2019 | Burgin | G06Q 30/0185 |
| 2019/0327501 A1 * | 10/2019 | Walters | G06T 7/248 |
| 2020/0065673 A1 * | 2/2020 | Huang | G06N 3/0454 |
| 2020/0065813 A1 * | 2/2020 | Walters | G06Q 20/4016 |

* cited by examiner

*Primary Examiner* — John B Strege
(74) *Attorney, Agent, or Firm* — Plumsea Law Group, LLC

(57) ABSTRACT

A system and method to detect fraudulent documents is disclosed. The system uses a generative adversarial network to generate synthetic document data including new fraud patterns. The synthetic document data is used to train a fraud classifier to detect potentially fraudulent documents as part of a document validation workflow. The method includes extracting document features from sample data corresponding to target regions of the documents, such as logo regions and watermark regions. The method may include updating a cost function of the generators to reduce the tendency of the system to generate repeated fraud patterns.

20 Claims, 7 Drawing Sheets

SYSTEM AND METHOD FOR DETECTING FRAUDULENT DOCUMENTS

TECHNICAL FIELD

The present disclosure generally relates to fraud detection for documents. More specifically, the present disclosure generally relates to a system and method for detecting fraudulent patterns in documents.

BACKGROUND

Validating document authenticity is an important function in many government and business services. For instance, the government may require applicants for an entry visa to submit various kinds of documents including letters certifying their education level (or completion of a degree). Governments or businesses often do not have the resources to manually inspect all of these documents and must therefore rely on automated validation processes.

However, it may be difficult to obtain a sufficient number of fraudulent documents to train an automated system. As new forms of fraud are developed to fool existing automated systems, there is an even greater need for obtaining an increasing set of sample fraudulent documents. Further, even if a sufficient number of samples could be obtained, the automated systems may not be sufficiently versatile to identify new forms of fraud.

There is a need in the art for a system and method that addresses the shortcomings discussed above.

SUMMARY

The embodiments include systems and methods for fraud detection. The system uses deep learning based fraud detection models. The system requires only a small sample of fraudulent documents. Using a custom pipeline of models employing techniques from the fields of artificial intelligence and machine learning, the system and method can be used to generate new samples, or synthetic data, which can be used to train a fraud classifier for deployment in document validation workflows. The method employs the use of robust AI techniques (such as generative adversarial networks and conditional generative adversarial networks) to detect and generate key feature regions that are commonly tampered within documents. This may be contrasted with systems that used rule based methods of sample generation.

Identified regions are handed to separate tampered region generators which generate potential fraud samples. These models aim to build a repository of new and emerging fraud patterns. Data from the repositories are back tested on existing documents to identify positive cases of fraud. The results of this back testing are fed back into the model to record actual positive patterns into the repository. Negative patterns are stored in the repository and tested on newer documents occasionally to determine the emergence of such patterns. At the same time, all patterns which have been previously identified are penalized in the tampered region generators to ensure they are not regenerated by the system so that the model is always trying to find new fraud patterns. As it may not be possible to validate all flagged documents, a semi-supervised model is used to develop a fraud detection classification model.

The exemplary systems and methods enable realistic AI fraud samples to be generated to outwit fraudsters in low base rate fraud events. By generating synthetic samples, the system and method may be preemptive in identifying tampered/fraudulent documents. By using generative AI models, the embodiments provide a more robust and efficient method for identifying fraud patterns without the need to teach new fraud methods to the system using rules or additional sample data.

To reduce the likelihood that the system will converge on particular fraud patterns, the exemplary method may include a step of modifying the cost function of the generative model (for example, of a generative adversarial network (GAN)). By modifying the GAN's cost function, the generator is forced to create and test patterns it has not found before thereby improving fraud detection.

Furthermore, the embodiments employ a modular approach that easily scalable across document features and types. Models for feature extraction and for generating new fraud patterns can both be easily adapted to accommodate additional features (such as new regions in a document). Additionally, by providing different kinds of initial sample data (documents), the system can be trained for fraud detection of different document types, and therefore, can be used across different domains.

In one aspect, a method of document fraud detection includes the steps of generating a set of synthetic training documents. Generating the set of synthetic training documents further includes steps of receiving an initial set of training documents, extracting a document feature from the training documents, and using a generative adversarial network to generate the set of synthetic training documents, where the generative adversarial network receives information about the document feature as input. The method also includes a step of training a document fraud detection system using the set of synthetic training documents.

In another aspect, the embodiments include a non-transitory computer-readable medium storing software comprising instructions that are executable by one or more device processors to detect fraudulent documents by generating a set of synthetic training documents and training a document fraud detection system using the set of synthetic training documents. Generating the set of synthetic training documents further includes steps of receiving an initial set of training documents, extracting a document feature from the training documents and using a generative adversarial network to generate the set of synthetic training documents, where the generative adversarial network receives information about the document feature as input.

In another aspect, a system for detecting fraudulent documents includes a device processor and a non-transitory computer readable medium storing instructions that are executable by the device processor to generate a set of synthetic training documents by receiving an initial set of training documents, extracting a document feature from the training documents, and using a generative adversarial network to generate the set of synthetic training documents, where the generative adversarial network receives information about the document feature as input. The instructions are also executable by the device processor to train a document fraud detection system using the set of synthetic training documents.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments include systems and methods to detect fraudulent documents. This may include detecting one or more fraud patterns associated with the documents. As used herein, the term "fraud pattern," (or "fraudulent pattern") refers to identified patterns in one or more portions of a document known to differ from a validated source document (or set of sample documents). For example, a system and method could detect a substantial variation in one or more letters of a signature on a fraudulent document as compared to the signature on a validated version of the document. This particular variation in the letters may correspond to a particular fraud pattern. As another example, a system and method could detect a substantial difference in the ink color of a signature on a fraudulent document as compared to the ink color on a validated version of the document. This difference in ink color may correspond to another kind of fraud pattern.

Figure 1:
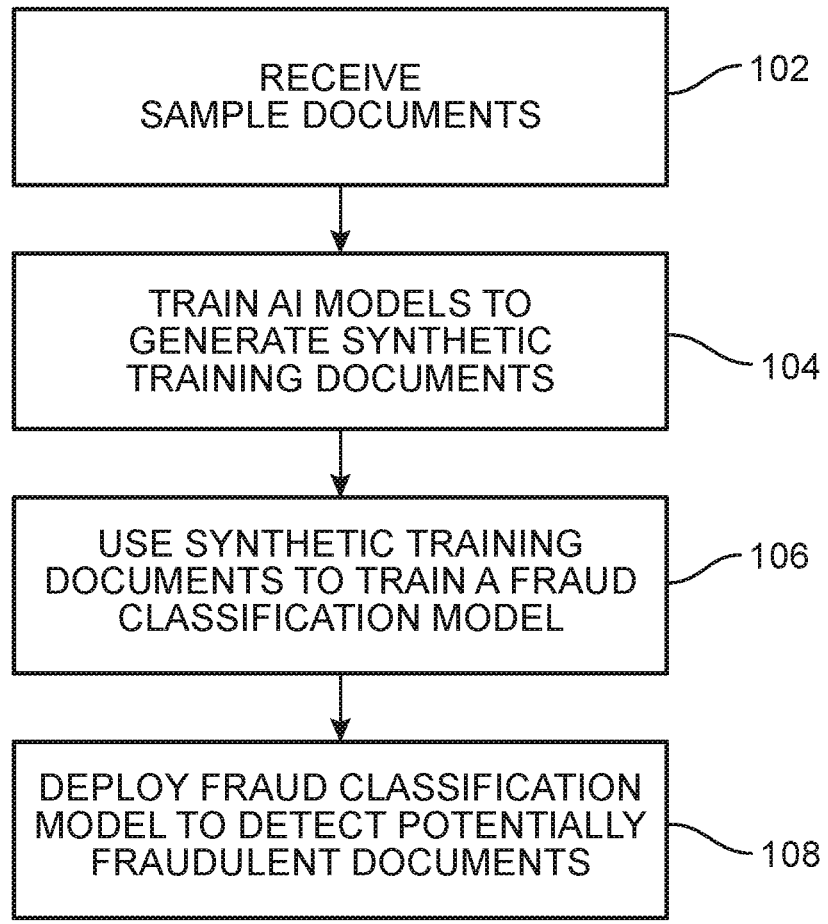
FIG. 1 is a schematic view of a process for training and deploying fraud detection systems, according to an embodiment.

FIG. 1 depicts a schematic process for document fraud detection. In the present embodiment, one or more of the steps in this process may be performed by a fraud detection system. A fraud detection system may be used in a variety of different contexts by a variety of different users. For example, a government office responsible for issuing visas could employ a fraud detection system to automatically flag potentially fraudulent documents that may be provided as proof of education, employment, and/or citizenship. It may be appreciated that in some cases a fraud detection system could be operated by the end-user (such as a government office or business) while in other cases it could be operated by an information technology services provider that runs and maintains the fraud detection system on behalf of the end-user.

In a first step 102, the fraud detection system may receive sample documents, which may serve as training documents. In some cases, the sample documents may include both validated documents and fraudulent documents (that is, documents where one or more regions have been tampered or modified). In other cases, the sample documents may include only validated documents. Validated documents may include documents that have been previously certified or validated as authentic. For example, a letter from a university may be certified as having been printed on official university letterhead.

Next, in step 104, AI models associated with the fraud detection system may be used to generate synthetic training data. More specifically, the AI models of the fraud detection system may be trained to generate synthetic training documents. As used herein, the term "synthetic training document" refers to a document that has been generated (at least in part) by an AI or machine learning system. Specifically, the synthetic training document may be generated by a so-called generative AI model. A generative AI model may take in inputs and output random instances of a target variable (such as regions of a document). In some cases, the synthetic training documents may comprise regions that include one or more fraud patterns. That is, the synthetic training documents may comprise samples of (artificially generated) fraudulent documents that can be used to train other systems (such as classifiers) in identifying fraudulent documents.

In step 106, the synthetic training documents generated in the previous step are used to train a fraud classification model. The fraud classification model may be any AI or machine learning model that takes one or more documents as input and outputs a classification for the one or more documents. The classification may identify the document(s) as potentially fraudulent or not.

In step 108, the fraud classification model may be deployed in the context of a document validation workflow. New documents are fed into the classifier and any potentially fraudulent documents may be flagged for further review. In some cases, as described in further detail below, key or target regions of a document may be flagged, as opposed to flagging the entire document. By flagging specific regions, rather than the whole document, the system may reduce the burden on an agent who must manually review the document for authenticity.

Figure 2:
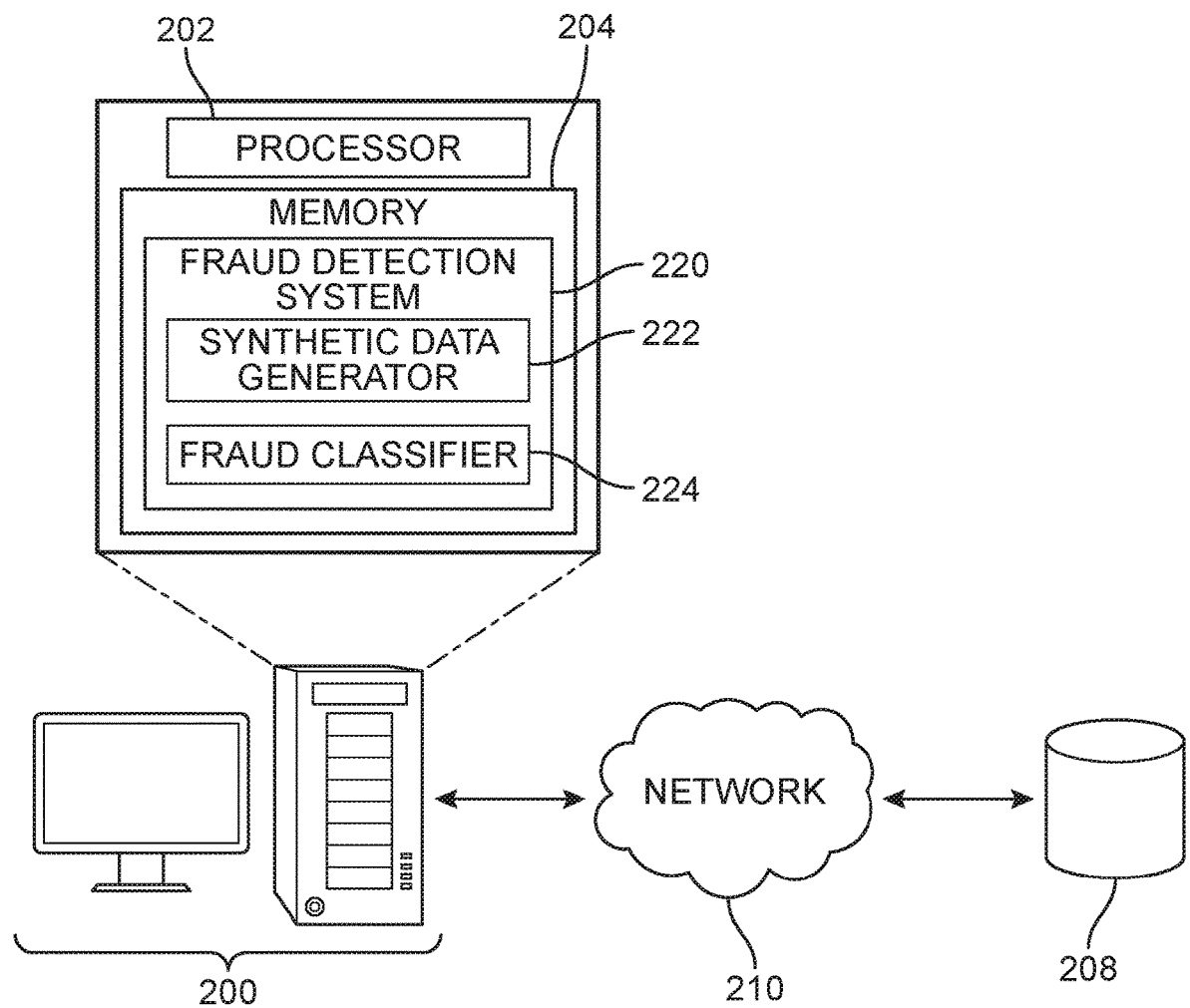
FIG. 2 is a schematic view of a system for accomplishing the process depicted in FIG. 1, according to an embodiment.

As shown in the embodiment of FIG. 2, a system for performing some, or all, of the steps described in the embodiments can include a computing system 200, databases 208 and a network 210. Computing system 200 could include a single computer, server and/or combination of multiple computers and/or servers. Computing system 200 may include at least one processor 202 and memory 204 for storing information, including software information and/or data. Processor 202 may include a single device processor located on a single device, or it may include multiple device processors located on one or more physical devices. Memory 204 may include any type of storage, which may be physically located on one physical device, or on multiple physical devices.

Computing system 200 may communicate with one or more databases 208 over network 210. In some embodiments, network 210 may be a wide area network ("WAN"), e.g., the Internet. In other embodiments, network 210 may be a local area network ("LAN"). For example, in a more remote location far from a metropolitan area, the Internet may not be available. In yet other embodiments, network 210 may be a combination of a WAN and a LAN.

The exemplary system can include a fraud detection system 220 stored within memory 204. Fraud detection system 220 may include any software, processes or services used in retrieving, generating, and/or analyzing documents. In some cases, fraud detection system 220 may further comprise a synthetic data generator 222 and a fraud classifier 224. As described above, synthetic data generator 222 may be used to generate new samples of synthetic training documents that can be used to train fraud classifier 224.

Databases 208 may comprise systems for storing both an initial collection of sample validated documents, sample fraudulent documents, as well as synthetic fraudulent documents generated by fraud detection system 220.

Figure 3:
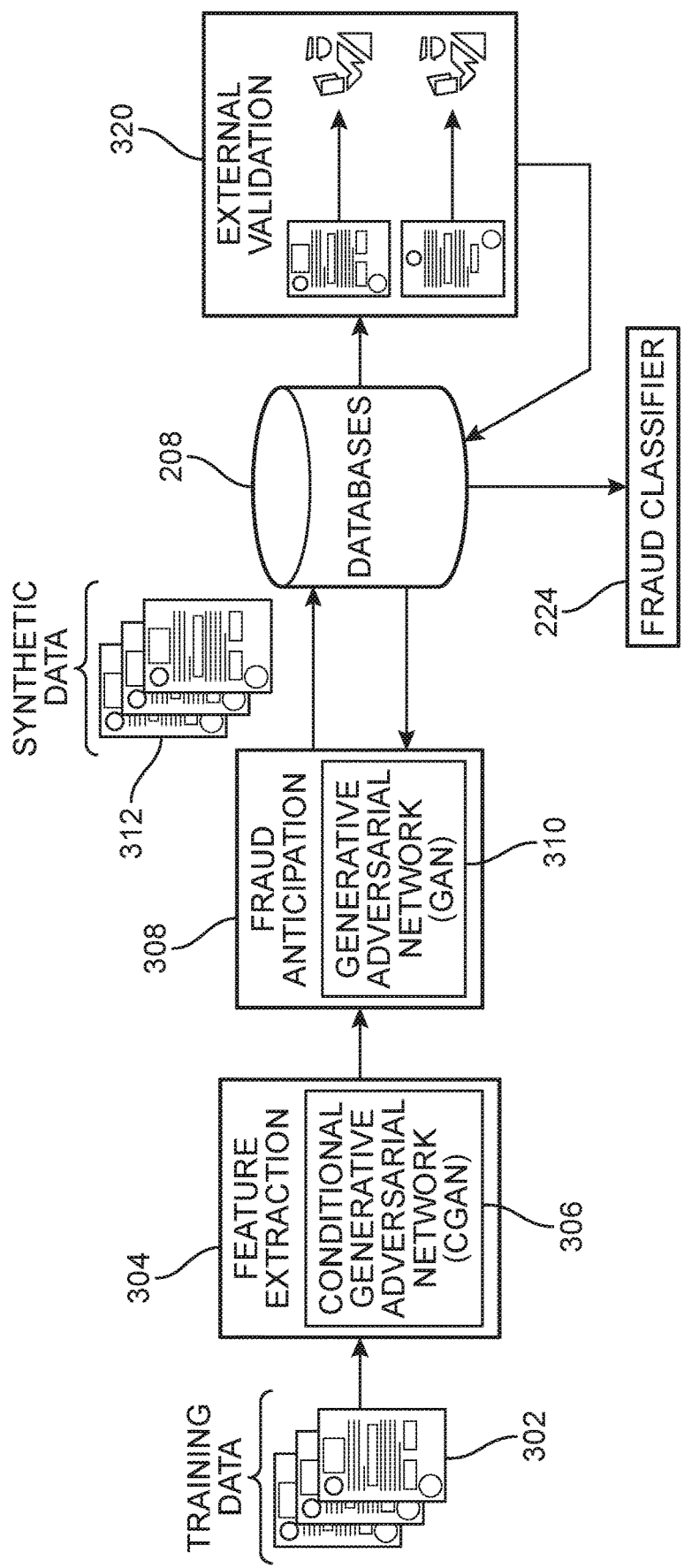
FIG. 3 is a schematic view of high-level systems and processes associated with the system of FIG. 2, according to an embodiment.

FIG. 3 is a schematic view of some components of a synthetic data generator (such as synthetic data generator 222). These components comprise an AI pipeline that takes in training data 302 (or sample document data) to generate synthetic data 312 (or synthetic training documents). Training data 302 may comprise various documents. In some embodiments, training data 302 could include multiple samples of the same document. This may help ensure the system can learn to recognize normal wear and tear, rather than classifying such differences as due to tampering/fraud. In some embodiments, the initial training data provided to the system may also include sample fraud documents with labels. The labels may include the target regions where fraud may be detected (for example, watermark regions and logo regions).

The AI pipeline can include models for feature extraction as well as models for generating fraudulent samples. In the exemplary embodiment depicted in FIGS. 3-4, the processes of feature extraction and fraudulent sample generation are performed by types of generative adversarial networks. Generative adversarial networks (GANs) are a class of artificial intelligence algorithms that employ two neural networks. Specifically, a GAN includes a first neural network (referred to as the "generator") that generates new candidates to serve as the input to a second neural network (referred to as the "discriminator") that evaluates the generated candidates for authenticity. In the context of fraud detection, the generator generates new candidates of fraudulent documents (or regions of documents), while the discriminator attempts to discriminate between generated candidates and sample training documents provided in a separate data stream.

Generating synthetic documents with new fraud patterns begins by feeding training data 302 into a feature extraction module 304. Feature extraction module 304 may comprise one or more algorithms for extracting features from the training data 302. These can include any known feature extraction methods, including various kinds of machine learning methods used for extracting features.

To extract features from sample data, the embodiments may use a type of GAN known as a conditional generative adversarial network (cGAN). Specifically, conditional generative adversarial networks are generative adversarial networks where the generated output is conditioned on class labels in the training data. In one embodiment, feature extraction module 306 may include a conditional generative adversarial network module 306 (or cGAN 306). cGAN 306 may take in training documents as input and generate bounding boxes around different types of key regions of interest (such as logos, signatures, headers, and watermarks) to act as labeled inputs for the next stage in the process. Using cGAN 306, feature extraction module 304 may identify likely target regions where documents may be tampered with. These regions may include regions associated with a logo, a signature, a watermark as well as possibly other regions in a document.

The features extracted from feature extraction module 304 are then fed into fraud anticipation module 308. The purpose of fraud anticipation module 308 is to generate new synthetic documents that are representative of known fraudulent patterns and/or potential future fraudulent patterns. That is, fraud anticipation module 308 may generate synthetic documents with fraudulent patterns that are likely to appear in the future, even if they have not been detected previously. Fraud anticipation module 308 can comprise one or more algorithms for generating new documents based on the features extracted from feature extraction module 304.

In one embodiment, fraud anticipation module 308 may include a generative adversarial network 310 (or, GAN 310). As described in further detail below, GAN 310 may further comprise a generator and a discriminator. Using GAN 310, fraud anticipation module 308 may generate documents in which the target regions identified by feature extraction module 304 have been modified (or artificially tampered) in a manner that attempts to anticipate known or potential fraud patterns.

It may be appreciated that the term "document" as used herein, could refer to a variety of different representations of a document. For example, documents could take the form of digital documents with a given file format (such as ".doc" or ".pdf"). Documents could also refer to images of documents. For example, the AI algorithms described above may take receive images of documents (for example as jpeg or pdf images) and analyze this information to detect fraudulent patterns.

Synthetic data generated by fraud anticipation module 308 can be passed to one or more databases 208. An external validation module 320 may then be used to review documents in the databases, including synthetic documents. In some cases, external validation includes manual inspection by a human agent. That is external validation module 320 may incorporate both algorithmic processes and manual processes performed by a user of the system. The human agent could be someone familiar with a particular type of document and/or a particular document validation workflow. Information from external validation module 320 may be provided as feedback that is used to modify the data stored in databases 208. For example, a sample of documents from databases 208 may be reviewed to determine which are actually fraudulent. Then databases 208 may be updated to include information about confirmed fraudulent documents.

Figure 4:
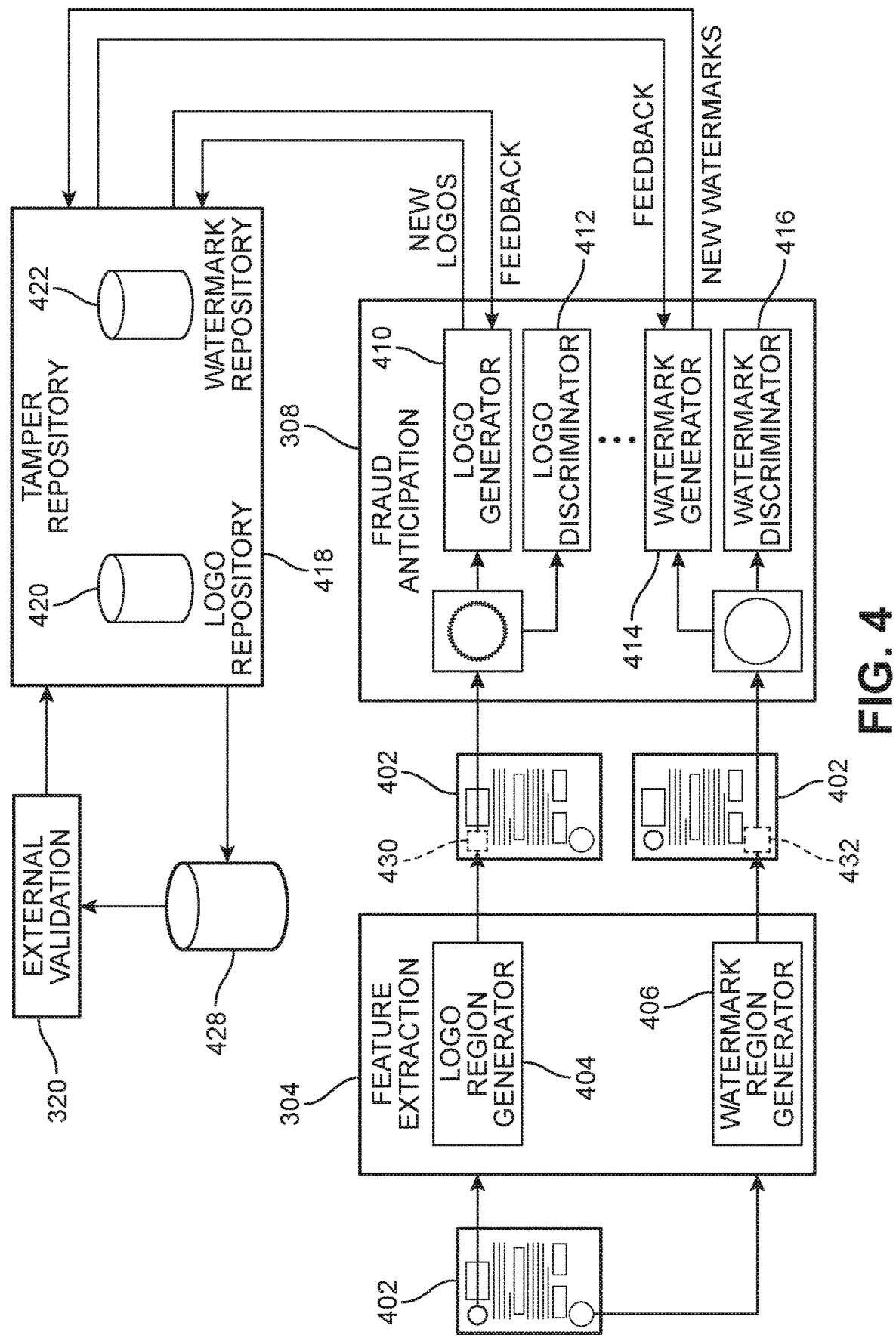
FIG. 4 is a schematic view various sub-systems and sub-processes associated with the systems and processes of FIG. 3, according to an embodiment.

FIG. 4 is a schematic view of some components of a synthetic data generator (such as synthetic data generator 222), in which some sub-components of cGAN 306 and GAN 310 are schematically depicted. Referring to FIG. 4, each sample document 402 is first processed by feature extraction module 304. Specifically, document 402 is processed by a logo region generator 404 and watermark region generator 406, which each comprise separate conditional generative adversarial networks tasked with generating different target regions in the document conditioned on labels in the training data (documents). As seen in FIG. 4, logo region generator 404 generates a target logo region 430 within document 402. Watermark region generator 406 generates a target watermark region 432 within document 402.

Next, data about these target regions are passed to fraud anticipation module 308. Data about target logo region 430 is fed into logo generator 410 and logo discriminator 412, which together comprise a first generative adversarial network. Data from target watermark region 432 is fed into watermark generator 414 and watermark discriminator 416, which together comprise a second generative adversarial network. Each discriminator (that is, logo discriminator 412 and watermark discriminator 414) may also be fed a stream of sample training data to compare with the generated samples.

The output from both logo generator 410 and watermark generator 414, in the form of synthetic logos (or logo regions) and synthetic watermarks (or watermark regions), is then stored in tamper repository 418. In some embodiments, tamper repository 418 may comprise a logo repository 420 for storing logos (or logo regions) created by logo generator 410. In some embodiments, tamper repository 418 may also comprise a watermark repository 422 for storing watermarks (or watermark regions) created by watermark generator 414.

Information from tamper repository 418 is then used to build synthetic training documents. As discussed previously, and shown in FIG. 3, a fraud classifier (for example, fraud classifier 224) is built to identify if existing documents within the document database 428 match the synthetically generated documents. These documents can include documents associated with various application processes, such as documents required to obtain a visa. Existing documents within database 428 that match any fraud patterns associated with information stored in tamper repository 418 are flagged by the system. The flagged documents in documents database 428 may be further subject to external validation 320, as discussed above.

In addition, in some embodiments, information from tamper repository 418 may also be fed back to logo generator 410 and watermark generator 414 to help ensure the generators produce new fraud patterns. This process is described in further detail below and shown in FIG. 6.

Figure 5:
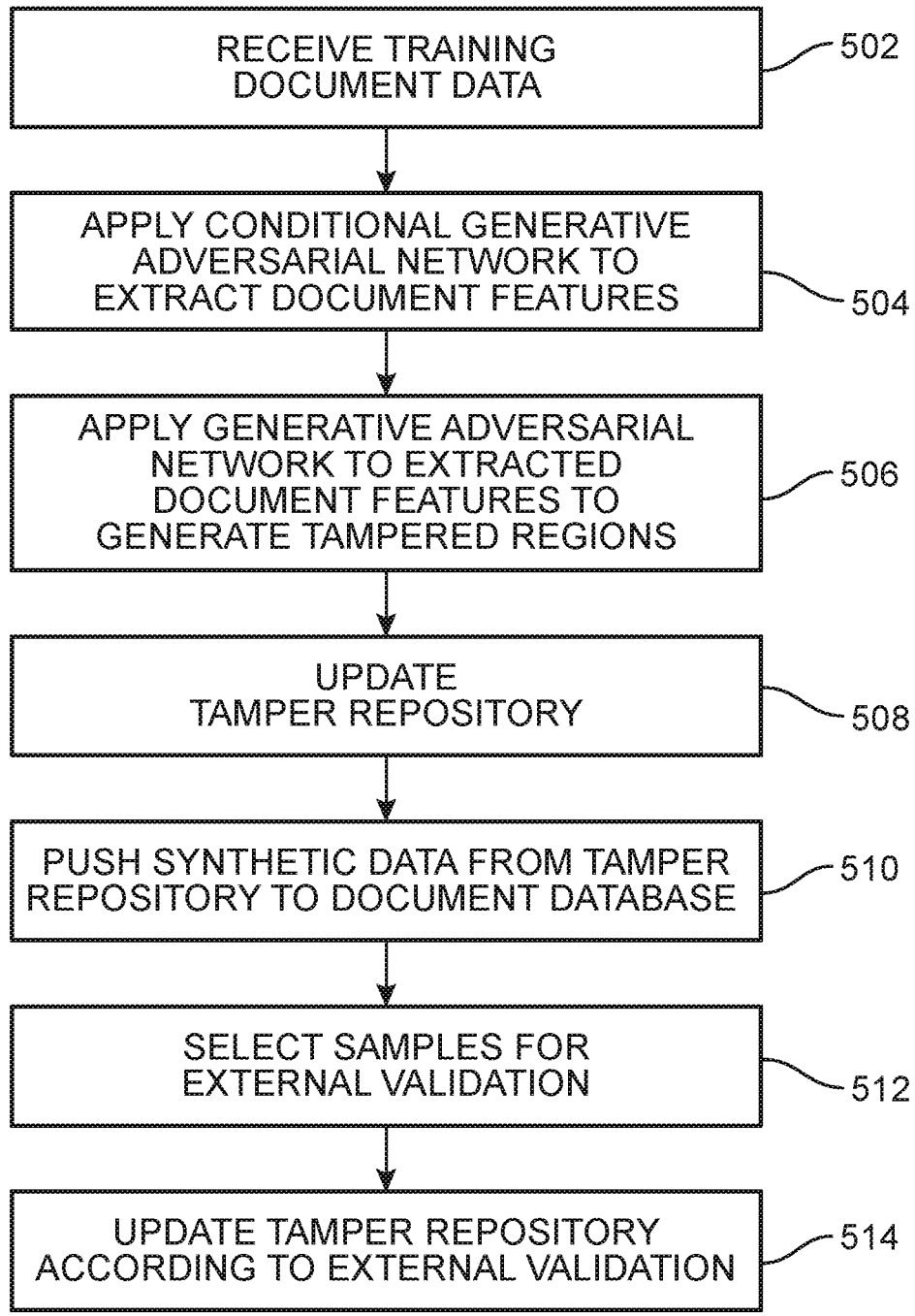
FIG. 5 is a schematic view of a process for generating synthetic training data for fraud detection, according to an embodiment.

FIG. 5 summarizes some of the processes described above and partly depicted in FIGS. 3 and 4. Although the embodiment describes each step as being performed by a fraud detection system (such as fraud detection system 220), in other embodiments some steps could be performed by another system and/or human user.

In a first step 502, the fraud detection system receives training document data (for example, training data 302).

Next, in step 504, the fraud detection system applies one or more conditional generative adversarial networks (cGANs) to the training data to extract one or more distinct document features. These may include, for example, target regions within the document, such as a logo region, a header region, a signature region, a footer region, or a watermark region.

Next, in step 506, the fraud detection system applies a generative adversarial network to the extracted document features to generate tampered regions (that is, tampered versions of the target regions identified by the feature extraction module). For example, the generative adversarial network may produce synthetic samples of different document regions that may include new fraud patterns that have not been previously identified.

Next, in step 508, the fraud detection system may update the tamper repository (for example, tamper repository 418). The information from the tamper repository is then used to construct synthetic training documents that are backtested via a fraud classifier on the document database in step 510. The purpose of the classifier is to identify documents within the database that match the synthetically generated documents and hence could possibly be tampered documents themselves. In step 512, documents that are flagged from the document database are analyzed by an external validation process. The results of the validation process are used to update the tamper repository in step 514.

Embodiments may include provisions to reduce the tendency of the fraud anticipation module to generate duplicate fraud patterns (that is, target regions in a document that have been modified in a substantially similar same way). Specifically, some embodiments can include provisions that penalize generators in the fraud anticipation module (such as a logo generator or watermark generator) from generating duplicate patterns.

In some cases, the cost function of each generator can be modified to penalize the generation of duplicate fraud patterns. As used herein, the term "cost function" refers to any process an algorithm uses to estimate how well the algorithm is performing compared to a (possibly unknown) optimal solution.

Figure 6:
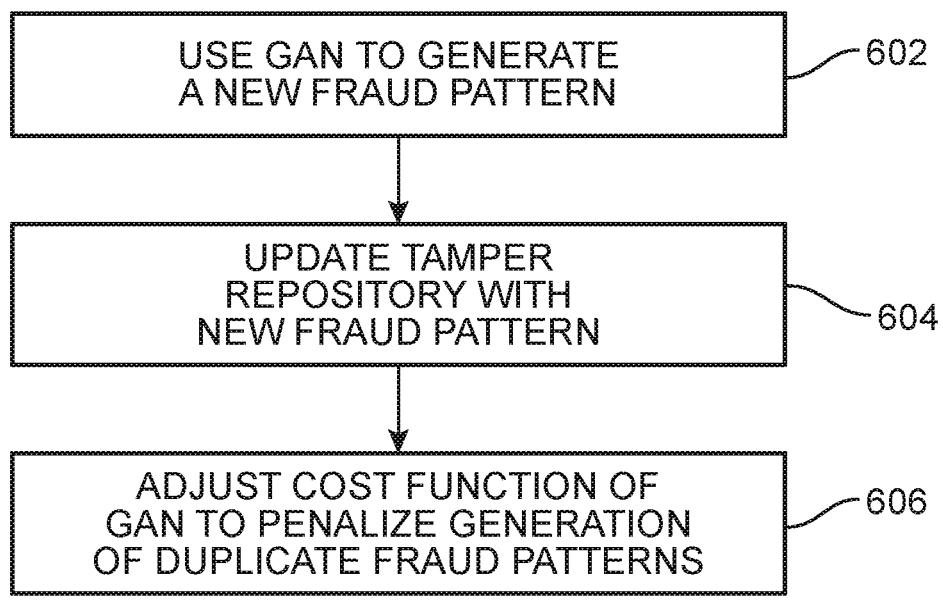
FIG. 6 is a schematic view a process for penalizing a generative adversarial network for generating repeated fraud patterns, according to an embodiment.

FIG. 6 is a schematic view of a process for penalizing a generator for producing duplicate fraud patterns. This process may be used with one or more generators of a fraud anticipation module. For example, this process may be used with logo generator 410 and waterpark generator 412, shown in FIG. 4. For convenience, the following discussion assumes that these steps are performed by a component of a fraud detection system.

In a step 602, the fraud detection system may use a generative adversarial network (specifically, the generator in the GAN) to generate a new fraud pattern. As an example, FIG. 4 depicts how logo generator 410 is used to generate synthetic logo data comprising fraud patterns (or potential fraud patterns). Next, in step 604, the fraud detection system may update the tamper repository (for example, tamper repository 418) with the new fraud pattern. Information about this new fraud pattern is then used to adjust the generator in a feedback mechanism. Specifically, in step 606, the system adjusts the cost function of the GAN to penalize the GAN for generating duplicate fraud patterns. This step is indicated schematically in FIG. 4 as dataflow arrows moving from tamper repository 418 to logo generator 410 and from tamper repository 418 to watermark generator 412.

Figure 7:
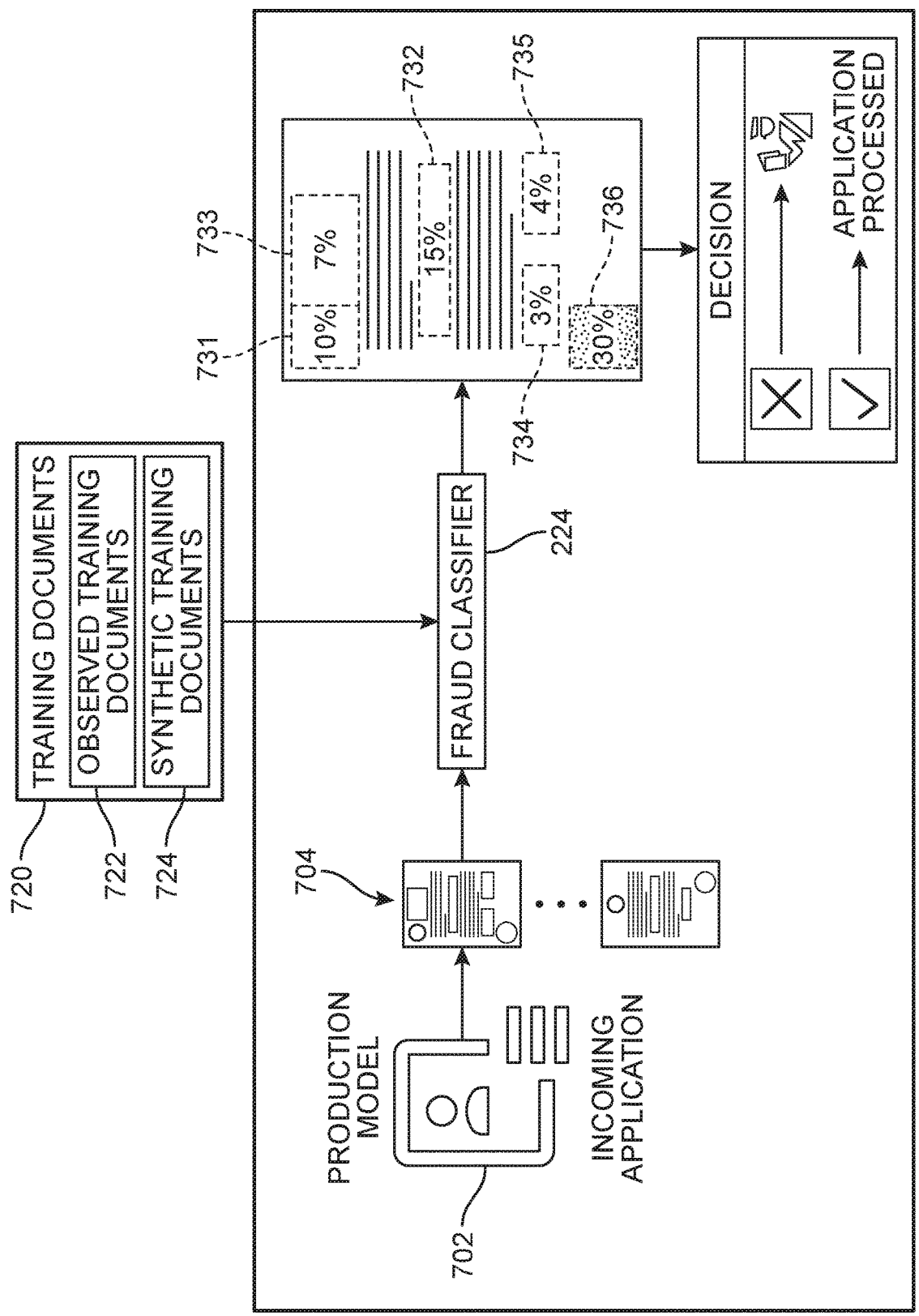
FIG. 7 is a schematic view various systems and processes associated with a fraud classification model, according to an embodiment.

FIG. 7 is a schematic view of the flow of information for a deployed fraud detection system, according to an embodiment. Referring to FIG. 7, an incoming application 702 may include a plurality of documents 704 that require validation before the application can be processed. To perform automated validation, the fraud detection system may use a fraud classifier 224. Fraud classifier 224 could be any kind of suitable AI or machine learning model. In one embodiment, fraud classifier 224 could be a semi-supervised learning model. Exemplary classes of semi-supervised models include generative models, low-density separation models (such as transductive support vector machines) and graph-based methods.

Fraud classifier 224 may be trained using a set of training documents 720. Training documents 720 could include both observed training documents 722 and synthetic training documents 724. Observed training documents 722 may include real samples of documents that have been previously collected. These may include both validated and fraudulent documents. Synthetic training documents 724 may include documents generated by the processes described above for generating synthetic document data with fraud patterns.

In some embodiments, a fraud classifier could be configured to classify different regions of a document. As an example, in FIG. 7, fraud classifier 224 may provide a separate classification for six different document regions, including first region 731, second region 732, third region 733, fourth region 734, fifth region 735 and sixth region 736. In the exemplary embodiment, fraud classifier 224 may return a percentage corresponding to the probability that the region has been tampered with (meaning a fraudulent pattern has been detected in the region). Regions with percentages higher than a threshold percentage could be flagged for further review. In the exemplary embodiment, sixth region 736 may be flagged by the system (indicated schematically with shading) for having a relatively high potential fraud percentage of 30%. For example, the threshold may be 20%. In this case, the remaining regions are not flagged since they are classified with percentages below 20%. In other embodiments, each region could simply be classified as potentially fraudulent or not. That is, the classification could be binary. In still other embodiments, the entire document could be classified, rather than classifying distinct regions.

As seen in FIG. 7, documents (and/or each region of the documents) could be either sent to a user of the system for further review, or passed along for further processing. Specifically, if one or more regions of the document are classified as having relatively high potential fraud percentages (or scores), then the document could be sent to a user (such as a human agent) for further review. Otherwise, the document could be automatically processed without requiring user interaction.

The various machine learning algorithms described above may be implemented using known machine learning software packages and/or frameworks. These include the SciPy library for the Python programming language and the Tensorflow machine learning framework. Specifically, the algorithms described above, including algorithms for implementing generative adversarial networks, conditional generative adversarial networks, and semi-supervised classification models, may be implemented using known software packages.

Implementations of the various techniques described herein may be implemented in digital electronic circuitry, or in computer hardware, firmware, software, or in combinations of them (e.g., an apparatus configured to execute instructions to perform various functionality).

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a non-transitory "computer-readable storage medium" or a "computer readable storage device."

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor may receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of document fraud detection, the method comprising the steps of:
    generating a set of synthetic training documents, wherein generating the set of synthetic training documents comprises:
        receiving an initial set of training documents;
        extracting a document feature from the training documents; and
        using a generative adversarial network to generate the set of synthetic training documents, wherein the generative adversarial network receives information about the document feature as input, wherein the generative adversarial network comprises a generator and a discriminator, and the generator comprises a neural network with a generator cost function;
    identifying a fraud pattern associated with the set of synthetic training documents;
    updating the generator cost function; and
    training a document fraud detection system using the set of synthetic training documents.

2. The method according to claim 1, the method further comprising steps of:
    receiving a document;
    using the document fraud detection system to detect tampered regions in the document; and
    providing an alert that tampered regions have been detected in the document.

3. The method according to claim 1, wherein extracting the document feature includes using a conditional generative adversarial network.

4. The method according to claim 1, wherein the document fraud detection system includes a semi-supervised learning algorithm, and wherein training the document fraud detection system comprises training the semi-supervised learning algorithm.

5. The method according to claim 1, wherein the document feature is associated with a region of a document.

6. The method according to claim 5, wherein the region is associated with a logo in the document.

7. The method according to claim 5, wherein the region is associated with a watermark in the document.

8. The method according to claim 5, wherein the region is associated with a signature in the document.

9. The method according to claim 1, further comprising:
    penalizing the generator for producing repeated fraud patterns in the set of synthetic training documents.

10. The method according to claim 1, wherein updating the generator cost function further comprises updating the generator cost function to reduce the likelihood that the generator will produce another synthetic document with the identified fraud pattern.

11. A non-transitory computer-readable medium storing software comprising instructions that are executable by one or more device processors to detect fraudulent documents by:
    generating a set of synthetic training documents, wherein generating the set of synthetic training documents comprises:
        receiving an initial set of training documents;
        extracting a document feature from the training documents;
        using a generative adversarial network to generate the set of synthetic training documents, wherein the generative adversarial network receives information about the document feature as input, wherein the generative adversarial network comprises a generator and a discriminator and the generator comprises a neural network with a generator cost function;
    identifying a fraud pattern associated with the set of synthetic training documents;
    updating the generator cost function; and
    training a document fraud detection system using the set of synthetic training documents.

12. The non-transitory computer-readable medium according to claim 11, wherein extracting the document feature includes using a conditional generative adversarial network.

13. The non-transitory computer-readable medium according to claim 11, wherein the document fraud detection system includes a semi-supervised learning algorithm, and wherein training the document fraud detection system comprises training the semi-supervised learning algorithm.

14. The non-transitory computer-readable medium according to claim 11, wherein the document feature is associated with a region of a document.

15. The non-transitory computer-readable medium according to claim 11, wherein the region is associated with a logo in the document.

16. The non-transitory computer-readable medium according to claim 11, wherein the region is associated with a watermark in the document.

17. The non-transitory computer-readable medium according to claim 11, wherein the region is associated with a signature in the document.

18. A system for detecting fraudulent documents, the system comprising:
   a device processor; and
   a non-transitory computer readable medium storing instructions that are executable by the device processor to:
   generate a set of synthetic training documents by:
      receiving an initial set of training documents;
      extracting a document feature from the training documents; and
      using a generator of a generative adversarial network to generate the set of synthetic training documents, wherein the generator receives information about the document feature as input;
   train a document fraud detection system using the set of synthetic training documents;
   identify a fraud pattern associated with the set of synthetic training documents; and
   penalize the generator for producing repeated fraud patterns in the set of synthetic training documents.

19. The system according to claim 18, wherein the document feature is associated with a region of a document.

20. The system according to claim 18, wherein the generative adversarial network comprises a discriminator, wherein the generator comprises a neural network with a generator cost function, and wherein the non-transitory computer readable medium storing instructions are also executable by the device processor to:
   update the generator cost function.

* * * * *